United States Patent
Duong (10) Patent No.: US 10,823,195 B2
(45) Date of Patent: Nov. 3, 2020

(54) DIFFUSER PIPE WITH NON-AXISYMMETRIC END WALL

(71) Applicant: PRATT & WHITNEY CANADA CORP., Longueuil (CA)

(72) Inventor: Hien Duong, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 196 days.

(21) Appl. No.: 15/955,205

(22) Filed: Apr. 17, 2018

(65) Prior Publication Data

US 2019/0316600 A1  Oct. 17, 2019

(51) Int. Cl.
| | |
|---|---|
| F04D 29/44 | (2006.01) |
| F04D 29/68 | (2006.01) |
| F02C 3/08 | (2006.01) |
| F04D 29/54 | (2006.01) |

(52) U.S. Cl.
CPC ............. *F04D 29/441* (2013.01); *F02C 3/08* (2013.01); *F04D 29/547* (2013.01); *F04D 29/681* (2013.01); *F04D 29/444* (2013.01); *F05D 2220/32* (2013.01); *F05D 2250/71* (2013.01)

(58) Field of Classification Search
CPC .... F04D 29/441; F04D 29/681; F04D 29/444; F04D 29/547; F02C 3/08; F05D 2250/184
See application file for complete search history.

(56) References Cited

U.S. PATENT DOCUMENTS

| | | | | |
|---|---|---|---|---|
| 571,612 | A * | 11/1896 | Eichhorn | F24D 1/00 237/67 |
| 1,518,705 | A * | 12/1924 | Raun | F16L 57/00 138/173 |
| 4,349,314 | A | 9/1982 | Erwin | |
| 5,327,940 | A * | 7/1994 | Presz, Jr. | F15D 1/04 138/37 |
| 5,992,465 | A * | 11/1999 | Jansen | F16L 55/00 138/37 |
| 6,540,481 | B2 | 4/2003 | Moussa et al. | |
| 7,628,583 | B2 * | 12/2009 | Roberts | F04D 29/444 415/208.3 |
| 9,874,223 | B2 * | 1/2018 | Theratil | F04D 29/668 |
| 9,874,224 | B2 | 1/2018 | Morita | |
| 2010/0129209 | A1 * | 5/2010 | Sugimoto | F04D 29/441 415/203 |
| 2013/0000308 | A1 * | 1/2013 | Dovbush | F04D 29/441 60/751 |
| 2016/0115971 | A1 * | 4/2016 | Duong | F04D 29/444 60/751 |

(Continued)

*Primary Examiner* — Eldon T Brockman
*Assistant Examiner* — Wesley Le Fisher
(74) *Attorney, Agent, or Firm* — Norton Rose Fulbright Canada LLP (57) ABSTRACT

A compressor diffuser for a gas turbine engine comprises a plurality of diffuser pipes having a tubular body. The pipes have a first portion having a radial component and defining a throat at a location along the first portion, a second portion having an axial component, and a curved portion fluidly linking the first portion and the second portion. The first portion has an inner surface with a local surface contour located between the throat and the curved portion. The local surface contour extends along a portion of and around less than an entire perimeter of the first portion.

19 Claims, 7 Drawing Sheets

(56) References Cited

U.S. PATENT DOCUMENTS

2016/0186690 A1* 6/2016 Florea .................... F01D 5/143
                                                        60/226.1
2017/0114794 A1   4/2017 Duong et al.
2019/0293087 A1* 9/2019 Tamada ............... F04D 29/441

* cited by examiner

DIFFUSER PIPE WITH NON-AXISYMMETRIC END WALL

TECHNICAL FIELD

The application relates generally to gas turbine engines and, more particularly, to compressor diffusers.

BACKGROUND

Diffuser pipes are provided in certain gas turbine engines for directing flow of compressed air from an impeller of a centrifugal compressor to an annular chamber containing the combustor, while diffusing the high speed air. These diffuser pipes are typically circumferentially arranged around a periphery of the impeller, and are designed to transform kinetic energy of the flow into pressure energy. Diffuser pipes typically seek to provide a substantially uniform exit flow with minimal distortion, because this is preferable for flame stability, low combustor loss, reduced hot spots etc.

Non-uniform flow in diffuser pipes of centrifugal compressors can however occur due to blockages of flow at the impeller exit. More particularly, incidence at the diffuser leading edge and the diffusion that follows can create build-up of the boundary layer with the flow. This thick boundary layer within the diffuser pipe may create vortices that accumulate low momentum flow on an inner surface of the diffuser pipe. These are undesirable as they reduce the overall aerodynamic performance and operating range of the centrifugal compressor.

SUMMARY

There is therefore provided a compressor diffuser for a gas turbine engine comprising: a plurality of diffuser pipes each having a tubular body including a first portion having a radial component and defining a throat at a location along the first portion, a second portion having an axial component, and a curved portion fluidly linking the first portion and the second portion, the first portion having an inner surface with a local surface contour located between the throat and the curved portion, the local surface contour extending along a portion of and around less than an entire perimeter of the first portion.

There is also provided a centrifugal compressor comprising: an impeller having an inner hub with a plurality of vanes extending therefrom, the impeller being rotatable within an outer shroud about a central longitudinal axis, the impeller having a radial impeller outlet; and a diffuser configured to diffuse gas received from the impeller outlet, the diffuser including: a plurality of diffuser pipes each having a tubular body with an inner surface defining an internal flow passage extending therethrough, the tubular body including a first portion extending in a first direction and defining a throat therein, a second portion extending in a second direction different from the first direction, and a curved portion fluidly linking the first portion and the second portion; and one or more surface contours disposed on the inner surface of the at least one diffuser pipe, the one or more surface contours being axially disposed within a region of the first portion, the region located downstream of the throat and upstream of the curved portion, the one or more surface contours extending circumferentially about a non-complete portion of the inner surface within said region, wherein an outer perimeter shape defined by the inner surface is non-uniform about a full circumference thereof at a given axial position within said region.

There is further provided a method for diffusing fluid flow in a centrifugal compressor, comprising: conveying the fluid flow through a diverging internal flow passage of a diffuser of the centrifugal compressor, the internal flow passage including an inlet, at least one curved portion downstream of the inlet, and a throat located between the inlet and the curved portion; and locally minimizing boundary layer growth within a region of the internal flow passage located downstream of the throat and upstream of the curved portion, by providing a non-axisymmetric diffuser within said region using one or more surface contours disposed on an inner surface of the internal flow passage, wherein an outer perimeter shape of the diffuser is non-uniform about a full circumference thereof at an axial plane within said region.

BRIEF DESCRIPTION OF THE DRAWINGS

Reference is now made to the accompanying figures in which.

DETAILED DESCRIPTION

Figure 1:
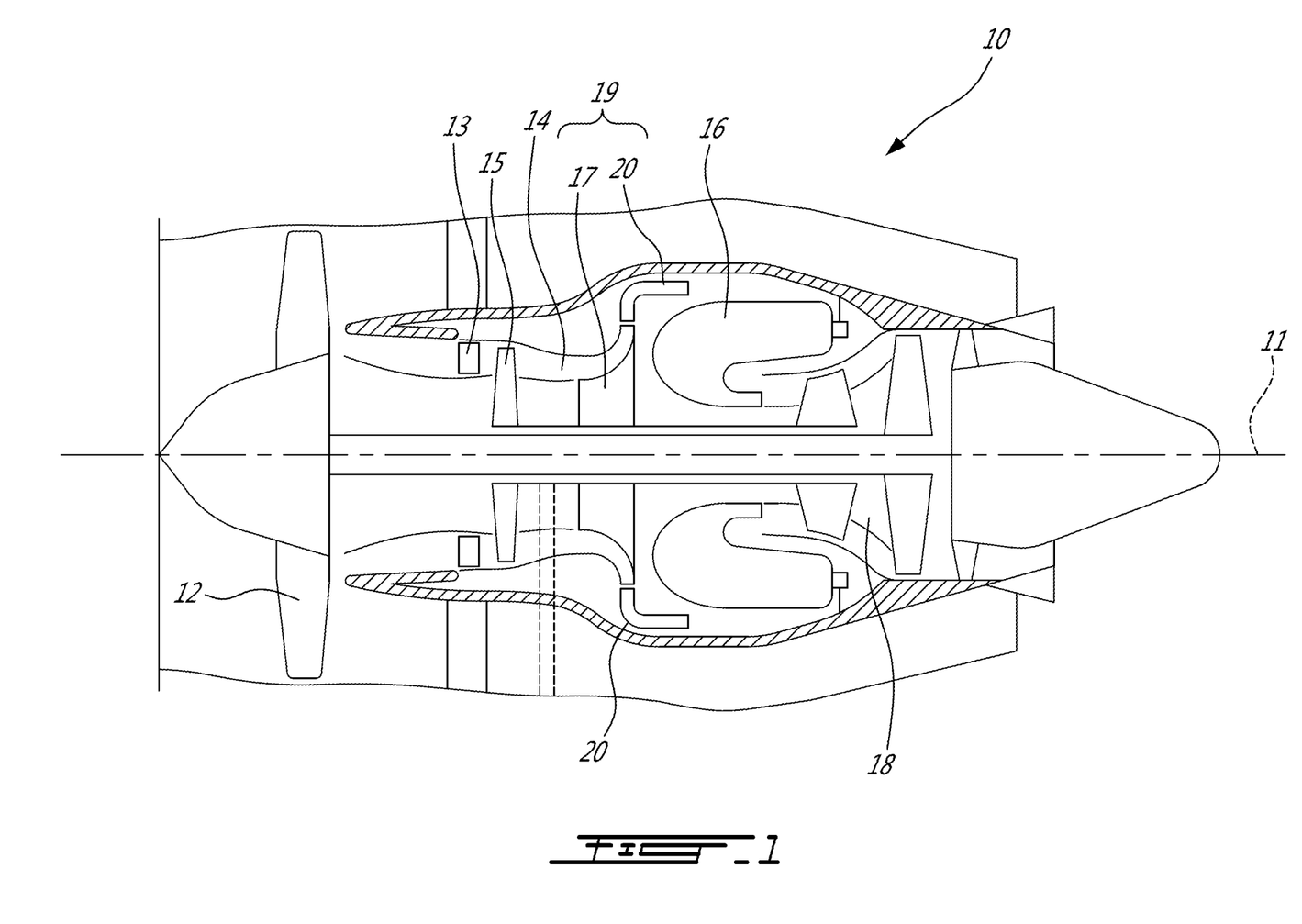
FIG. 1 is a cross-sectional view of a gas turbine engine.

FIG. 1 illustrates a gas turbine engine 10 of a type preferably provided for use in subsonic flight, generally comprising in serial flow communication along an engine axis 11: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 may include a plurality of stators 13 and rotors 15 (only one stator 13 and rotor 15 being shown in FIG. 1), and it may also include a centrifugal compressor 19.

The centrifugal compressor 19 of the compressor section 14 of the gas turbine engine 10 includes an impeller 17 and a plurality of diffuser pipes 20, which are located downstream of the impeller 17 and circumferentially disposed about a periphery of the exit of the impeller 17. The diffuser pipes 20 convert high kinetic energy at the impeller 17 exit to static pressure by slowing down fluid flow exiting the impeller. The diffuser pipes 20 may also redirect the air flow from a radial orientation (as it exits the impeller 17) to an axial orientation (i.e. aligned with the engine axis 11, as it exits the diffuser pipes 20). The Mach number of the fluid flow F decreases in the direction 27 of fluid flow F, and is lowest near the outlet 25 of each diffuser pipe 20. In most cases, the Mach number of the flow entering the diffuser pipes 20 may be at or near sonic, while the Mach number exiting the diffuser pipe 20 may be in the sub-sonic range of 0.2-0.25 Mach to enable stable air/fuel mixing, and light/re-light in the combustor 16.

Figure 2:
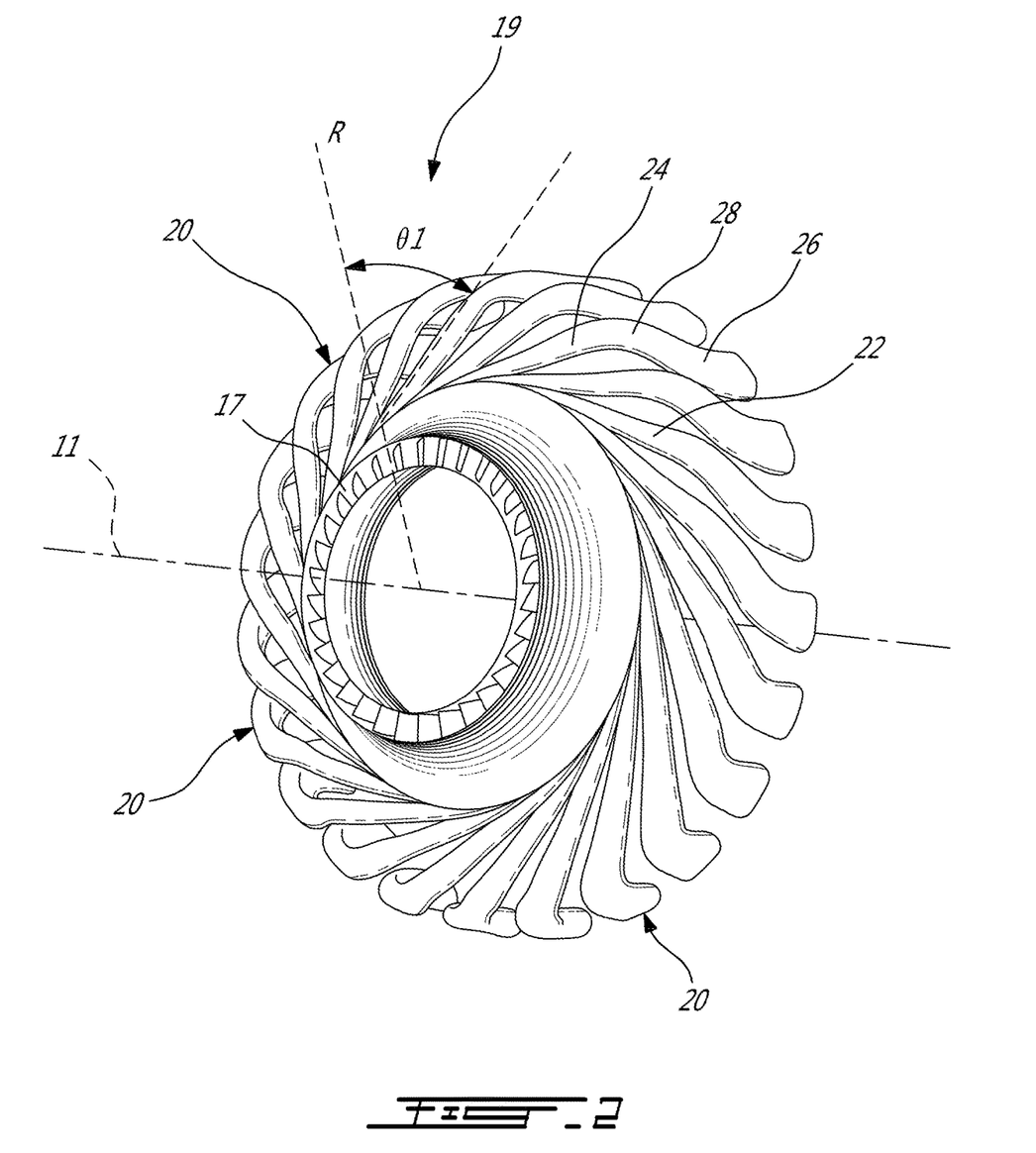
FIG. 2 is a perspective view of a centrifugal compressor for the gas turbine of FIG. 1, the centrifugal compressor including an impeller and a plurality of radially disposed diffuser pipes extending downstream of the impeller.

Turning now to FIG. 2, the centrifugal compressor 19 of the gas turbine engine 10 includes generally an impeller 17 and a plurality of diffuser pipes 20, also referred to as "fishtail diffuser pipes", which extend about the periphery of the exit of the impeller 17 and extend at least partially downstream therefrom.

Each of the diffuser pipes 20 includes a diverging (in a downstream direction) tubular body 22. This tubular body 22 of the diffuser pipes 20 may be formed, in one embodiment, of sheet metal. The enclosed tubular body 22 defines an internal flow passage 29 (seen in FIG. 3) extending the length of the diffuser pipe 20 and through which the compressed fluid flow is conveyed.

Figure 3:
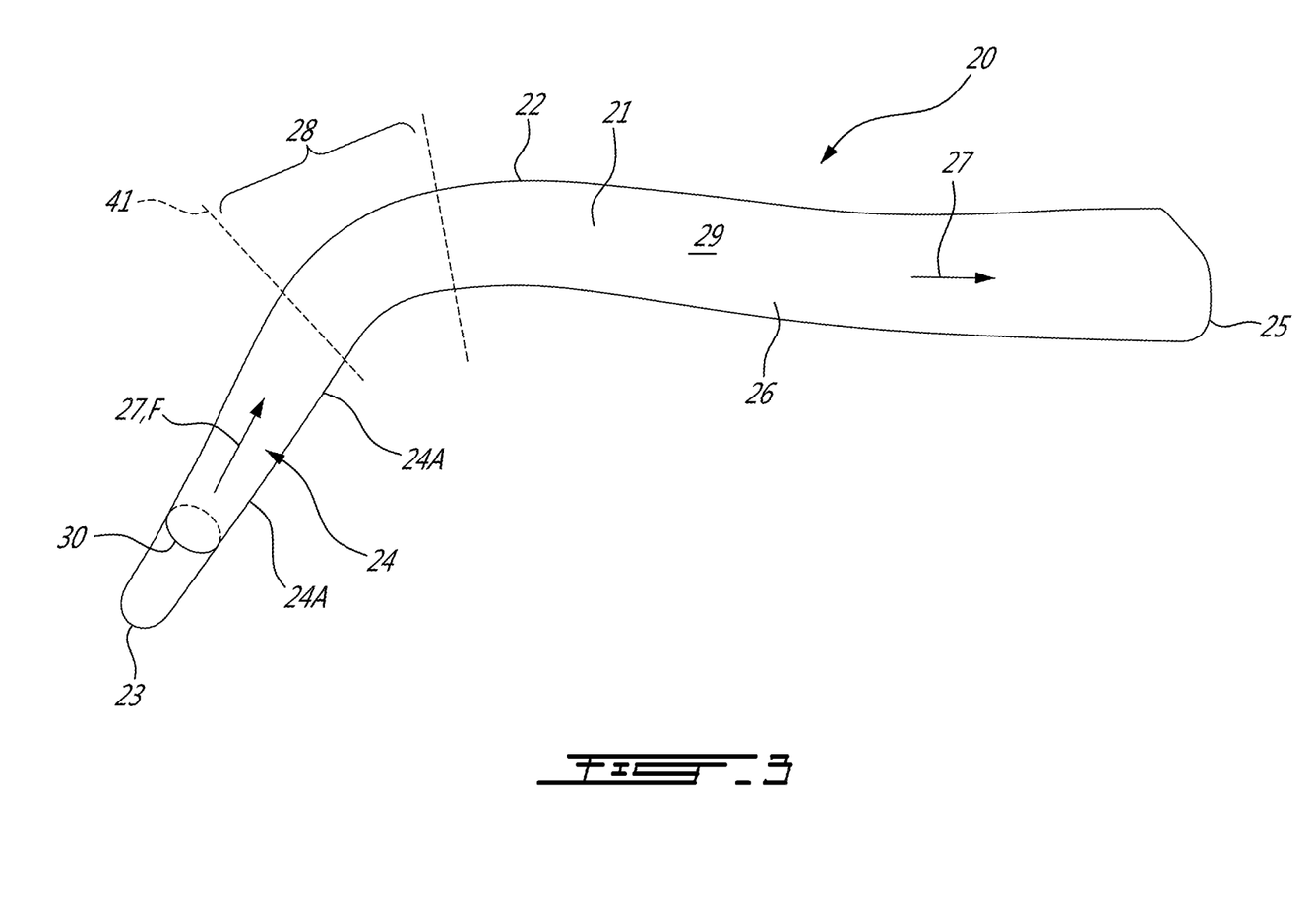
FIG. 3 is a partially-sectioned perspective view of a diffuser pipe of the compressor of FIG. 2, the diffuser pipe having a non-axisymmetric end wall according to an embodiment of the present disclosure.

As seen in both FIGS. 2 and 3, the tubular body 22 includes a first portion 24 extending generally tangentially and radially from the periphery of the impeller 17. An open end is provided at a most upstream end of the tubular body 22 and forms an inlet 23 of the diffuser pipe 20. The first portion 24 may be inclined at an angle 81 relative to a radial axis R. The angle 81 may be at least partially tangential, or even substantially tangentially, and may further correspond to a direction of the fluid flow at the exit of the blades of the impeller 17, such as to facilitate transition of the flow from the impeller 17 to the diffuser pipes 20. The first portion 24 of the tubular body 22 can alternatively extend more substantially along the radial axis R.

The tubular body 22 of the diffuser pipes 20 also includes a second portion 26, which is downstream from the first portion 24. The second portion 26 of the tubular body 22 of the diffuser pipes 20 is disposed generally axially, and is fluidly connected to the first portion 24 by an out-of-plane curved portion 28 or "bend". An open end at a most downstream end of the second portion 26 forms an outlet 25 of the diffuser pipe 20. Preferably, but not necessarily, the first portion 24 and the second portion 26 of the diffuser pipes 20 are integrally formed together and extend substantially uninterrupted between each other, via the curved, bend, portion 28.

The large swirl of the flow exiting the impeller 17, and therefore entering the first portion 24 of each of the diffuser pipes 20, may be removed and/or limited by shaping the diffuser pipe 20 with the curved portion 28, such that the flow is redirected axially before exiting to the combustor. For a given impeller exit Mach number and swirl of the flow, the effectiveness of a diffuser pipe may be dependent upon several factors, including its length and shape, and whether these contribute to produce undesirable aerodynamic blockages of the flow therein. This is particularly true at the impeller exit, wherein the incidence of the flow at the diffuser leading edge, and the diffusion that follows, can sometimes create rapid build-up of the boundary layer in the flow within the diffuser pipe.

The diffuser pipes 20 of the present disclosure are geometrically configured, as will be described in further detail below, such as to minimize the growth of the boundary layer, particularly near the inlet of the diffuser pipes, without needing to increase the length or the cross-sectional area of the diffuser pipes. By limiting the boundary layer build-up within the first portion 24 of the diffuser pipes 20, vortices that might otherwise occur within low momentum flow produced as a result of boundary layer growth may be broken up and/or reduced before they interact with each other. This may in turn result in more uniform flow, increased compressor performance and/or operating range (including but not limited to increased stall margin), reduced noise, or any combination of these.

Referring still to FIG. 3, the tubular body 22 of the diffuser pipe 20 diverges in the direction 27 of the fluid flow F therethrough, in that the internal fluid passage 29 defined within the tubular body 22 increases in cross-sectional area along its length which extends between the inlet 23 and the outlet 25 thereof. This increase in cross-sectional area of the internal fluid passage 29 through each diffuser pipe 20 may be continuous along the complete length of the tubular body 22, or alternately the cross-sectional area of the internal fluid passage 29 may increase in increments (for example, but not necessarily gradual increments) along the length of the tube. In the depicted embodiment, the cross-sectional area of the internal fluid passage 29 defined within the tubular body 22 increases gradually and continuously along its length, from the inlet 23 to the outlet 25.

In accordance with a particular aspect of the present disclosure, the first portion 24 of the diffuser pipe 20, upstream of the bend 28 and downstream of the throat 30, has a particular cross-sectional shape and profile, as will be described below. The second portion 26 of the diffuser pipe 20, downstream of the bend 28, may have any suitable cross-sectional shape such as, but not limited to a flattened oval (or oblong) cross-sectional shape. Other types of cross-sections for second portion 26 are however also within the scope of the present disclosure.

The first portion 24 of the diffuser pipe 20 is an upstream portion of each diffuser pipe 20 which receives the fluid flow F first from the exit of the impeller 17 (see FIG. 2), via the pipe inlet 23. The first portion 24 of the pipe has a smaller cross-sectional area along at least a portion of its length than that of the curved portion (or bend) 28 and the second portion 26 of the pipe downstream therefrom, which enables diffusion of the flow. Each diffuser pipe 20 defines and contains therein a throat 30 located at a point between the inlet 23 and the outlet 25 of the diffuser pipe 20. More particularly, however, the throat 30 is located in the first portion 24 of the diffuser pipe 20, downstream of the inlet 23 and upstream of the curved portion or bend 28. The precise location of the throat 30 within the first portion 24 can be determined using the measured flow characteristics of the fluid flow F within the diffuser pipe 20, or can correspond to a part of the diffuser pipe 20 (downstream of a given inlet region after the pipe inlet 23) having the smallest cross-sectional area. In the former case, the throat 30 is referred to as the "aerodynamic throat", and in the latter case, the throat 30 is referred to as the "geometric throat". It is understood, however, that the aerodynamic throat may not necessarily occur at the same point as the geometric throat. For the geometric throat 30, each diffuser pipe 20 expands in cross-sectional area along its length from the relatively small cross-sectional area of the geometric throat 30, thereby helping to diffuse the main gas flow as it is conveyed through the diffuser pipe 20.

The exact location of the aerodynamic throat 30 of the diffuser pipe 20 within the first portion 24 can vary depending on numerous factors such as the flow conditions of the fluid flow F in the diffuser pipe 20, the geometry of the diffuser pipe 20, and the flow conditions upstream and/or downstream of the diffuser pipe 20. For most applications, the location of the aerodynamic throat 30 within the first portion 24 can be suitably approximated for a given range of operating conditions of the compressor 19 using fluid dynamic analysis, and is approximately the same as the location of the geometric throat 30 within the first portion 24.

After the throat 30 and before bend 28, conventional pipe flow is normally constructed so that flow is diffused rapidly within the first portion 24 of the pipe 20. Examination of the flow at a plane normal to flow within this first portion 24 has revealed the possible interaction of two counter rotating flows within the diffuser pipe. The interaction of these cross flows may fuel further buildup of low momentum flow that has started at entry 23 of the diffuser pipe 20. Due to pressure gradients, the low momentum flow may then cross toward the pipe inner wall 24A and separate as it negotiates the bend 28 before the exit 25 of the diffuser pipe.

Figure 4:
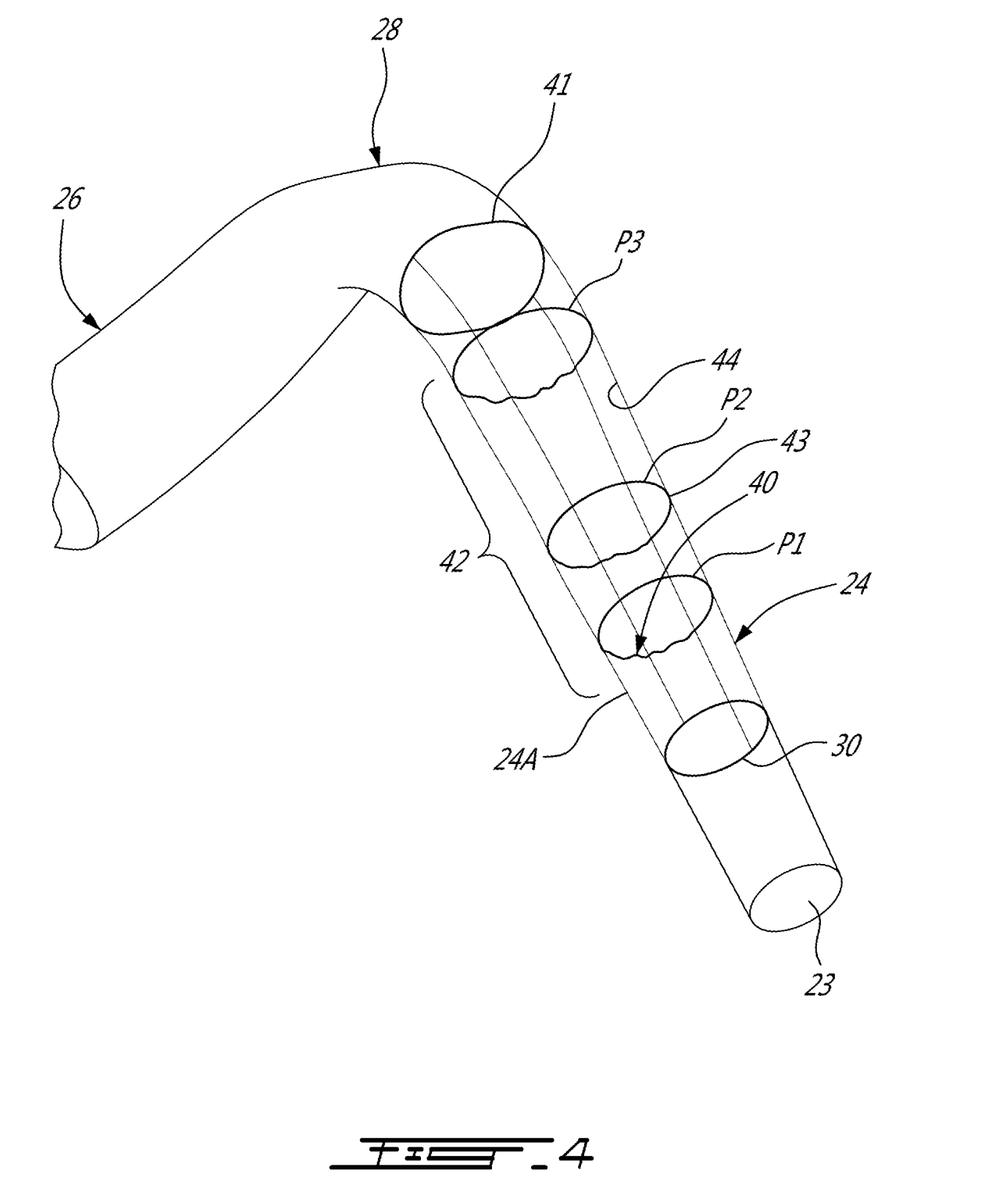
FIG. 4 is a side perspective view of the diffuser pipe of FIG. 3, shown partially transparent for illustration purposes.
Figure 5:
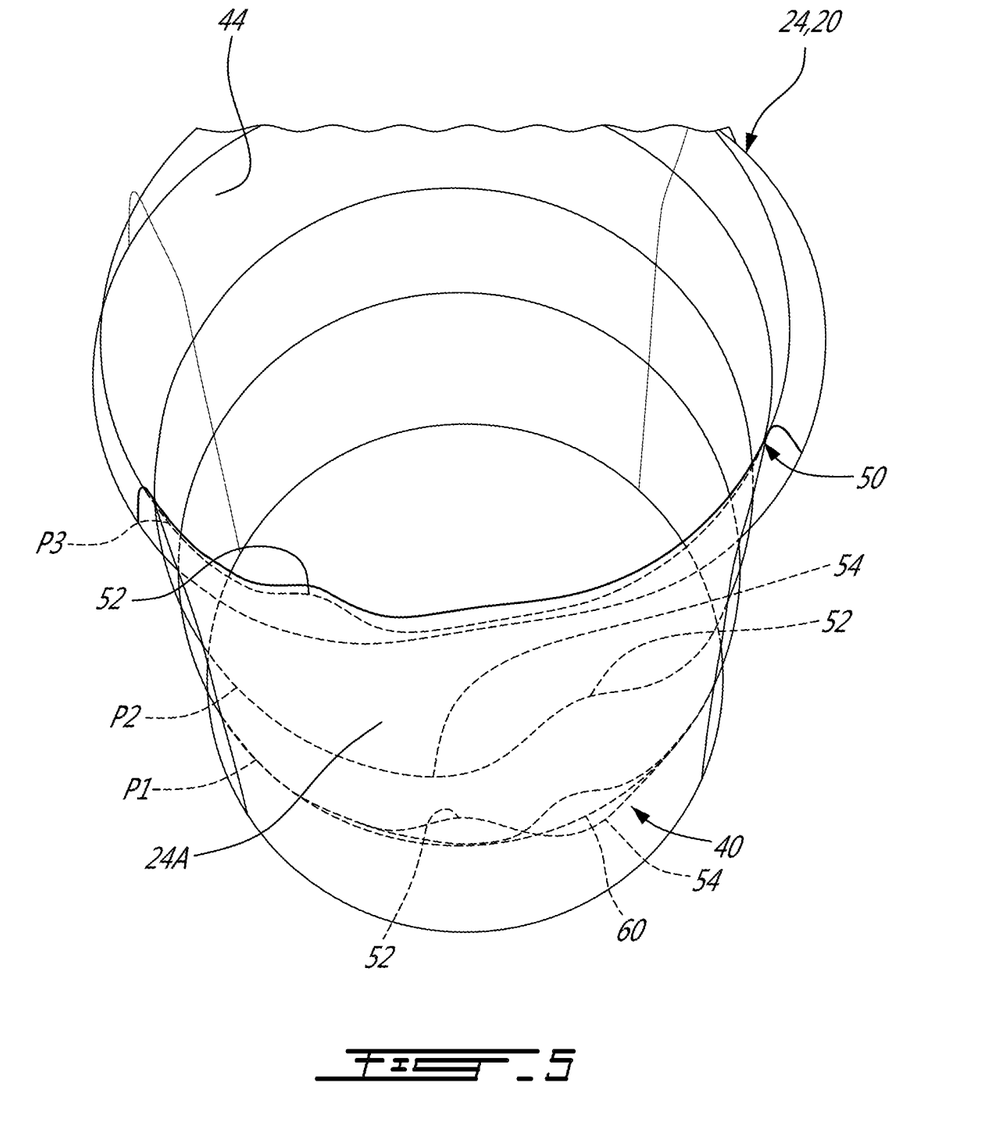
FIG. 5 is a partial perspective view of the diffuser pipe as shown in FIG. 4, looking upstream from the bend in the diffuser pipe.

Accordingly, referring now to FIGS. 4 and 5, the first portion 24 of the diffuser pipe 20 includes one or more surface contours 40, disposed within a region 42 of the first portion 24 that is located downstream of the aforementioned throat 30 and upstream of the bend 28 (and more particularly upstream of a plane 41 defining the starting point of the bend 28). The surface contours 40 are axially disposed (i.e. relative to the flow direction F) within the first portion 24 of the diffuser pipe 20, between the throat 30 and the bend 28. The surface contours 40 are thus disposed only within the radially extending first portion 24 of the diffuser pipe 20, downstream of the throat 30 and upstream of the 90 degree bend 28 which re-directs the flow axially and into the second portion 26 of the pipe. The diffuser pipes 20 are thus contoured locally, by the surface contours 40, in order to minimize the growth of the boundary layer which may otherwise due interaction of two above-described opposite rotating cross flow that have been found to exist within the first portion 24 of the diffuser pipe 20.

Figure 6A:
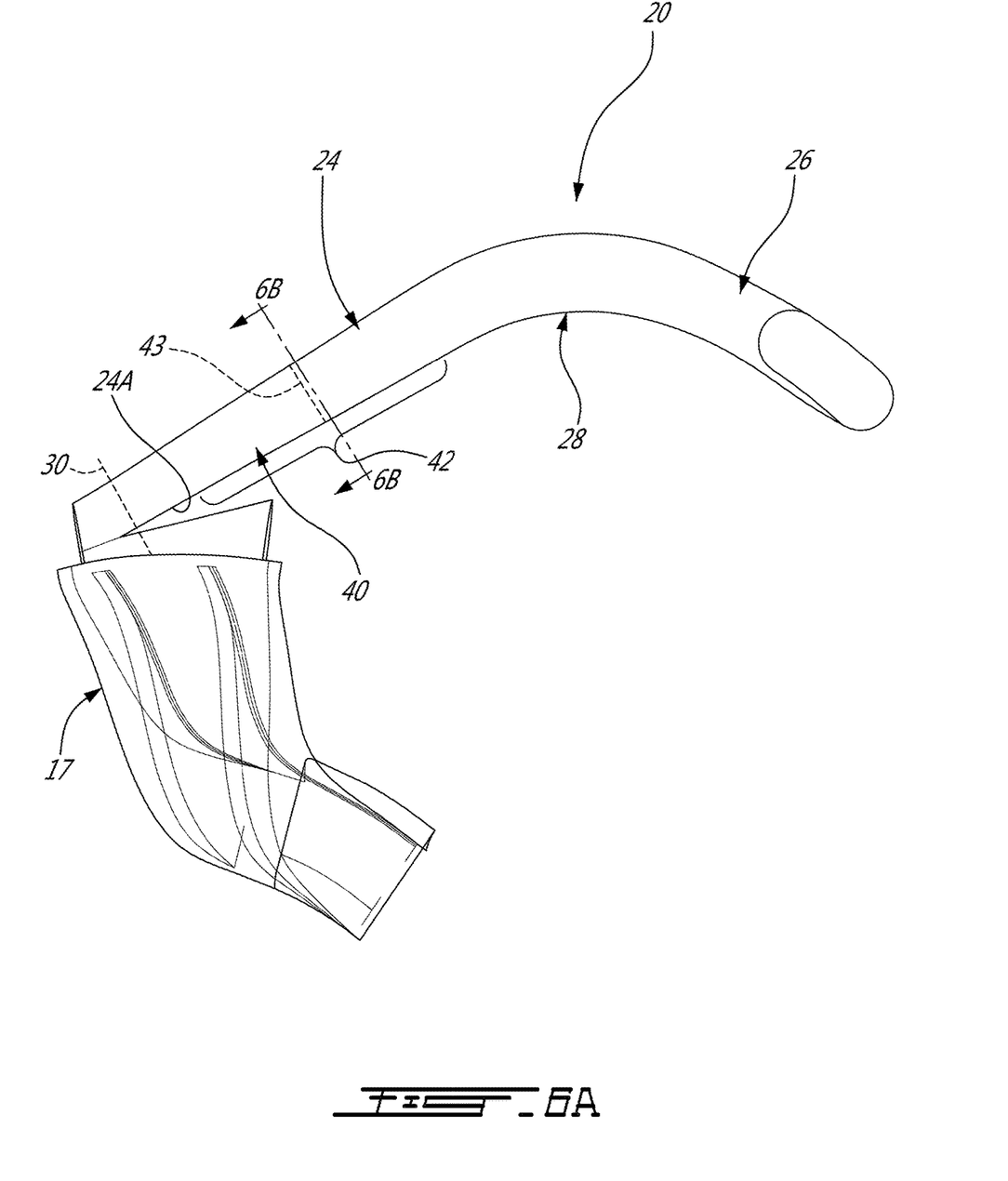
FIG. 6A is a partially sectional front elevational view of the impeller and a diffuser pipe of the compressor of FIG. 2.

In one particular embodiment, as best seen in FIGS. 4 and 6A, the surface contours 40 are located at least within an upstream half of the first portion 24 of the diffuser pipe 20, namely beginning at an axial (flow-wise) position located between the throat 30 and an axial midpoint 43 of the first portion 24 between the throat 30 and the bend 28. The region 42, within which the surface contours 40 are located, may therefore begin at an axial point located between the throat 30 and the midpoint 43, and extend axially downstream therefrom a predetermined distance. The region 42 will however necessarily terminate at or upstream of the plane 41 at the initiation of the bend 28, such that the region 42 and thus the surface contours 40 therein remain upstream of the bend 28.

Figure 6B:
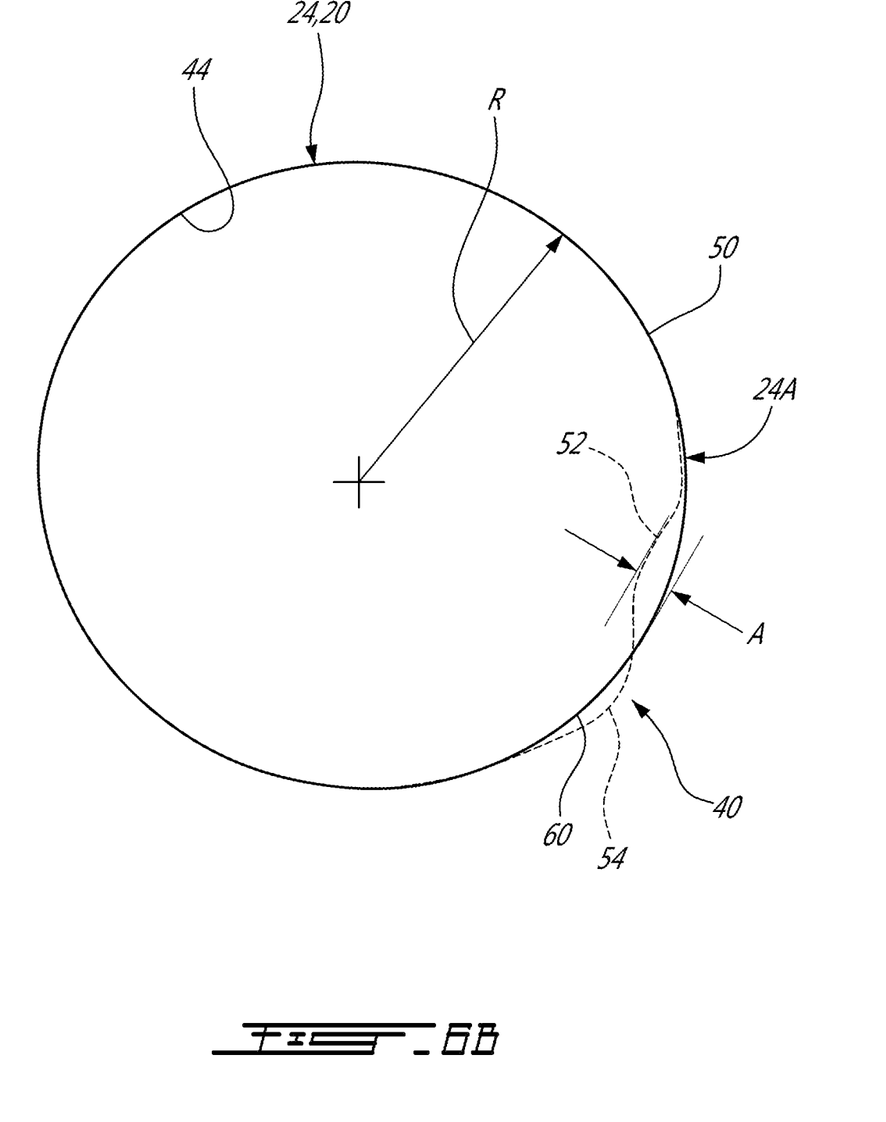
FIG. 6B is a cross-sectional view of the diffuser pipe, taken through line 6B-6B in FIG. 6A.

Referring to FIGS. 5, 6 and 6B, the surface contours 40 as described herein may form a non-smooth (aerodynamically) region on the flow-facing inner surface 44 of the pipe 20, which form an irregular surface profile relative to a nominal gas path boundary surface 60 of the diffuser pipe. Such a nominal gas path boundary surface 60, for example, may be defined by a smooth (i.e. non-contoured) surface disposed upstream or downstream from the region 42 but at the same circumferential position. Alternately, the nominal gas path boundary surface 60 may be defined by a smooth surface disposed at the same axial position as the surface contours but at a different circumferential position (e.g. on an opposite side of the pipe, for example, that is free of such surface contours 40.

The surface contours 40 may help limit boundary layer growth within the diffuser pipe 20, such as to prevent and/or limit vortices that might otherwise accumulate due to low momentum flow on the inner surface of the diffuser pipe. By limiting the presence of such vortices, and thus the low momentum air that they can accumulate, aerodynamic performance and/or operating range of the centrifugal compressor of the diffuser may be improved.

Referring still to FIGS. 5 to 6B, the irregular surface profile formed by the surface contours 40 may comprise, in at least one embodiment, bumps 52 and/or trenches 54 that protrude either into or away from the above-described nominal gas path boundary surface 60 as defined by the smooth surfaces of the interior wall 44 of the diffuser pipe 20.

As best seen in FIG. 6B, the radially extending height or amplitude A of each of the individual bumps 52 and/or trenches 54 may, in one particular embodiment, be approximately equal to 0.1 to 0.2 times the radius R of the inner wall 44 of the pipe 20. This smooth inner wall 44 defines the nominal gas path boundary 60 relative to which the amplitude A is measured. In one particular embodiment, the amplitude A is selected to be no more than 20% of the radius R of the section within a plane normal to the flow direction F, and the period of the sine-wave shaped contour so formed may be approximately within a quarter of the total circumference of the inner surface of the tubular body (which defines the outer perimeter profile 50).

The surface contours 40 may therefore include one or more bumps 52 and/or trenches 54 are circumferentially alternating and together form, for example, sine-wave shaped contour extending circumferentially on the inner, flow-facing, surface 44 of the pipe, at select circumferential locations within the region 42 of the diffuser pipe 20. These surface contours 40 are thus formed between the throat 30 and the bend 28 within at least a part of the region 42 within the first portion 24 of the pipe 20.

The sine-wave shaped surface contours 40 so formed extend only a portion of the circumference of the pipe (i.e. they do not extend about the full pipe circumference), and this circumferential portion is selected such as to locally minimize the growth of the boundary layer. In one particular embodiment, the surface contours 40 extend less than or equal to a quarter (i.e. 25%) of the full pipe circumference at any given axial position. In an alternate embodiment, the surface contours 40 extend circumferentially between 25% and 50% of the full circumference at any given axial position. The surface contours 40 however do not extend about the full circumference of the pipe at any given axial position. The outer perimeter 50 of the pipe, and more particularly a portion of its inner wall surface 44, is therefore said to be non-axisymmetric at any given axial position having the surface contours 40 therein.

The surface contours 40 thus do not extend about the full circumference of the inner wall 44 of the pipe 20 but are instead located only within a portion of the full circumference of the inner wall 44. As such, at any given axial location within the region 42 (as defined, for example, by a plane extending through the first portion 24 of the diffuser pipe 20 and the plane being normal to the flow direction F therewithin), the outer perimeter 50 of the diffuser pipe varies (i.e. is not constant) about its circumference. Stated differently, the outer perimeter shape 50 of at least part of the first portion 24 of the pipe, within the region 42, is not the same about its full circumference due to the presence of the surface contours 40 located at a predetermined circumferential location at any given flow-wise position within the region 42. At a selected axial location, therefore, a portion of the circumference of the outer perimeter 50 will be smooth and another portion will include the one or more surface contours 40 thereon.

As best seen in FIGS. 6A and 6B, in a particular embodiment, the surface contours 40 are disposed on a radially inner side wall 24A of the pipe 20, corresponding to the hub side of the impeller 17. For example, in the embodiment of FIG. 6B, the surface contours 40 are circumferentially disposed between 4 and 7 o'clock on the diffuser pipe 20.

Referring back to FIG. 4, the first portion 24 of the diffuser pipe 20 is divided into three planar sections that are normal to the flow direction F. At each of the these planes P1, P2 and P3, the inner hub contour of the inwardly facing wall 44 is formed having the "speed" bumps and/or trenches (52 and 54, as seen in FIGS. 5 and 6B) which form sine-wave like hub contours over a limited portion of the circumference of the pipe at each axial location. By modifying the hub contour of the diffuser pipes 20 near the vortex interaction point therein, the strength of vortexes which may be produced by low momentum air can be broken up and reduced before they interact with each other. The result is a smaller boundary layer build up. Downstream cross flow may thus be reduced and the accumulations of low momentum flow on the pipe inner side may also be limited. Overall centrifugal performance may therefore be possible with the diffuser pipes 20 as described herein, with better efficiency and better surge margin in comparison with similar diffuser pipes lacking the wall contouring and surface contours 40 as described herein.

Three dimensional wall contouring of a portion of the diffuser pipe, as provided by the surface contours 40 described herein, may accordingly provide an additional parameter that the designer can use to help achieve performance improvements without adding significant weight or size to the diffuser pipes and thus to the overall compressor. By positioning the surface contours 40 downstream of the fastest moving fluid flow F, which typically occurs at, or in close proximity to, the throat 30, the surface contours 40 are therefore positioned in the first portion 24 of the passage where the fluid flow F has a lower Mach number. The positioning of the surface contours 40 upstream of the bend of the curved portion 28 also allows them to limit boundary layer growth within the fluid flow F prior to flow turning at the bend, where flow separation is known to occur. This may accordingly help reduce aerodynamic losses and may contribute to improved overall compressor performance (e.g. stall enhancement, improved efficiency, etc.) and/or operating range.

The above descriptions are meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A compressor diffuser for a gas turbine engine comprising: a plurality of diffuser pipes each having a tubular body including a first portion having a radial component and defining a throat at a location along the first portion, a second portion having an axial component, and a curved portion fluidly linking the first portion and the second portion, the first portion having an inner surface with a local surface contour located between the throat and the curved portion, the local surface contour extending along a portion of the first portion and around less than an entire perimeter of the first portion, and the local surface contour including circumferentially alternating bumps and trenches that respectively protrude inwardly and outwardly relative to a nominal gas path boundary defined by a smooth surface of the inner surface.

2. The compressor diffuser of claim 1, wherein the local surface contour extends around less than a majority of the entire perimeter of the first portion.

3. The compressor diffuser of claim 1, wherein the local surface contour comprises speed bumps and/or trenches.

4. The compressor diffuser of claim 3, wherein the local surface contour is disposed on a radially inner side wall of the diffuser pipes corresponding to a hub side of an impeller located upstream of the compressor diffuser.

5. The compressor diffuser of claim 4, wherein the local surface contour is circumferentially disposed between 4 and 7 o'clock on the diffuser pipe when viewed in a plane extending normal to a flow direction and looking downstream.

6. The compressor diffuser of claim 1, wherein the local surface contour forms an irregular surface profile relative to the nominal gas path boundary.

7. The compressor diffuser of claim 1, wherein the bumps and trenches are circumferentially successive to form a sine-wave shaped contour, the sine-wave shaped contour defining an amplitude and a period.

8. The compressor diffuser of claim 7, wherein the amplitude is less than or equal to 20% of a radius of the inner surface within the first portion of the tubular body.

9. The compressor diffuser of claim 8, wherein the amplitude is between 10% and 20% of the radius of the inner surface within the first portion of the tubular body.

10. The compressor diffuser of claim 7, wherein the period of the sine-wave shaped contour is approximately within a quarter of a total circumference of the inner surface.

11. The compressor diffuser of claim 1, wherein the surface contour is located within a region of the first portion, the region beginning at a first axial point located between the throat and a midpoint of the first portion, and the region extending axially downstream therefrom to a second axial point located upstream of the curved portion.

12. A centrifugal compressor comprising:
an impeller having an inner hub with a plurality of vanes extending therefrom, the impeller being rotatable within an outer shroud about a central longitudinal axis, the impeller having a radial impeller outlet; and
a diffuser configured to diffuse gas received from the impeller outlet, the diffuser including:
a plurality of diffuser pipes each having a tubular body with an inner surface defining an internal flow passage extending therethrough, the tubular body including a first portion extending in a first direction and defining a throat therein, a second portion extending in a second direction different from the first direction, and a curved portion fluidly linking the first portion and the second portion; and
one or more surface contours disposed on the inner surface of at least one diffuser pipe of the plurality of diffuser pipes, the one or more surface contours being axially disposed within a region of the first portion, the region located downstream of the throat and upstream of the curved portion, the one or more surface contours extending circumferentially about a non-complete portion of the inner surface within said region, wherein an outer perimeter shape defined by the inner surface is non-uniform about a full circumference thereof at a given axial position within said region, and the one or more surface contours include circumferentially alternating bumps and trenches that respectively protrude inwardly and outwardly relative to a nominal gas path boundary defined by a smooth surface of the inner surface.

13. The centrifugal compressor of claim 12, wherein the outer perimeter shape of at least a part of the first portion of the at least one diffuser pipes, within said region downstream of the throat and upstream of the curved portion, is non-constant about a full circumference thereof.

14. The centrifugal compressor of claim 12, wherein the outer perimeter shape at said given axial position having a smooth portion extending about a majority of the full circumference and a contoured portion formed by the one or more surface contours.

15. The centrifugal compressor of claim 12, wherein the one or more surface contours are disposed on a radially inner side wall of the at least one diffuser pipe corresponding to a hub side of the impeller.

16. The centrifugal compressor of claim 15, wherein the one or more surface contours are circumferentially disposed between 4 and 7 o'clock on the at least one diffuser pipe when viewed in a plane extending normal to a flow direction within the internal flow passage and looking downstream.

17. The centrifugal compressor of claim 12, wherein the bumps and trenches are circumferentially successive to form a sine-wave shaped contour, the sine-wave shaped contour defining an amplitude and a period.

18. The centrifugal compressor diffuser of claim 17, wherein the amplitude is less than or equal to 20% of a radius of the inner surface within the first portion of the tubular body.

19. A method for diffusing fluid flow in a centrifugal compressor, comprising:
conveying the fluid flow through a diverging internal flow passage of a diffuser of the centrifugal compressor, the internal flow passage including an inlet, at least one curved portion downstream of the inlet, and a throat located between the inlet and the curved portion; and
locally minimizing boundary layer growth within a region of the internal flow passage located downstream of the throat and upstream of the curved portion, by providing a non-axisymmetric inner wall surface of the internal flow passage within said region using one or more surface contours disposed on the inner wall surface, wherein an outer perimeter shape defined by the inner wall surface of the internal flow passage is non-uniform about a full circumference thereof at given axial plane within said region, and the one or more surface contours including circumferentially alternating bumps and trenches that respectively protrude inwardly and outwardly relative to a nominal gas path boundary defined by a smooth surface of the inner wall surface.

* * * * *